United States Patent [19]

Sakakibara et al.

[11] 4,348,421
[45] Sep. 7, 1982

[54] PROCESS FOR RECONSTITUTING DEHYDRATED FOOD

[75] Inventors: Sakuichi Sakakibara, Kobe; Ko Sugisawa; Takashi Kimura, both of Nara, all of Japan

[73] Assignee: House Food Industrial Company Limited, Osaka, Japan

[21] Appl. No.: 265,807

[22] Filed: May 21, 1981

Related U.S. Application Data

[63] Continuation of Ser. No. 97,692, Nov. 26, 1979, abandoned, which is a continuation of Ser. No. 746,474, Dec. 1, 1976, abandoned.

[30] Foreign Application Priority Data

Dec. 9, 1975 [JP] Japan .................................. 50-165157
Dec. 9, 1975 [JP] Japan .................................. 50-165158

[51] Int. Cl.³ .................... A23L 1/00; B65D 81/32; B65D 81/34; B65B 29/06
[52] U.S. Cl. ..................................... 426/394; 206/217; 206/219; 206/514; 206/526; 220/20; 220/23; 220/408; 220/410; 426/115; 426/112; 426/120; 426/124; 210/469; 210/474; 53/474; 426/506; 426/509
[58] Field of Search .............. 426/113, 115, 119, 120, 426/124, 394, 506, 509, 112; 220/410, 408, 20, 23; 206/217, 219, 514, 526; 210/469, 474; 53/474

[56] References Cited

U.S. PATENT DOCUMENTS

| | | | |
|---|---|---|---|
| 2,236,641 | 4/1941 | Karmen | 426/120 |
| 2,539,771 | 1/1951 | Chambers | 426/115 |
| 2,980,540 | 4/1961 | Turpin | 426/115 |
| 3,228,776 | 1/1966 | Savage et al. | 426/120 |
| 3,287,140 | 11/1966 | Brussel | 426/113 |
| 3,385,503 | 5/1968 | Stump | 426/120 |
| 3,445,050 | 5/1969 | Peters et al. | 220/408 |
| 3,476,282 | 11/1969 | Monaco et al. | 426/115 |
| 3,514,029 | 5/1970 | Powell | 229/15 |
| 3,563,768 | 2/1971 | Melnick | 426/120 |
| 3,642,499 | 2/1972 | Castell | 426/124 |
| 3,928,045 | 12/1975 | Tsunoda et al. | 426/113 |
| 3,976,795 | 8/1976 | Ando | 426/115 |
| 4,018,355 | 4/1977 | Ando | 426/120 |
| 4,018,904 | 4/1977 | Muraoka | 426/115 |

FOREIGN PATENT DOCUMENTS

| | | | |
|---|---|---|---|
| 969139 | 6/1975 | Canada | 426/114 |
| 1098342 | 1/1961 | Fed. Rep. of Germany | 426/120 |
| 2306365 | 8/1974 | Fed. Rep. of Germany | 426/115 |
| 796428 | 10/1935 | France | 426/120 |
| 1024223 | 9/1950 | France | 206/219 |

*Primary Examiner*—S. Weinstein
*Attorney, Agent, or Firm*—Toren, McGeady & Stanger

[57] ABSTRACT

A utensil for reconstituting a two-component dehydrated dish includes three approximately cup-shaped container members having each a bottom wall and an annular wall transverse to the bottom wall and bounding an open side of the member opposite the bottom wall. A first container defines a cavity dimensioned to receive the other two members substantially entirely. The bottom walls of the first and of a second member are imperforate, the bottom wall of the third member being formed with a plurality of perforations. Positioning means permit the second and third members to be positioned in the cavity of the first member in respective positions in which the bottom walls of the second and third members are transversely offset from each other and from the bottom wall of the first member, and the second and third members are open in the same direction as the first member.

3 Claims, 4 Drawing Figures

PROCESS FOR RECONSTITUTING DEHYDRATED FOOD

This is a continuation of Application Ser. No. 097,692 filed Nov. 26, 1979, now abandoned, which, in turn, is a continuation of Application Ser. No. 746,474 filed Dec. 1, 1976, now abandoned.

This invention relates to the preparation of food, particularly to the reconstituting of a dish from at least two dehydrated components, and more specifically to a container suitable for such reconstituting.

Many types of food are commercially available in pre-cooked and at least partly dehydrated condition, and can be made ready for consumption by contact with hot water. While the greatest number of such foods was originally intended for backpackers and campers, pre-cooked rice is used in many households in large amounts, and other convenience foods of the same general type find increasing acceptance by the public at large. The several foods require different periods of contact with hot water and do not reach their best consistency unless heated with water for the specific optimum period. Many two-component or multicomponent dishes, therefore, could not be packaged in a joint evelope heretofore.

It is an object of this invention to provide a utensil which is suitable for storing the dehydrated components of a multi-component dish and permits the reconstituting of each component by independently timed contact with hot water thereby to prepare food ready for consumption.

With this object and others in view, the utensil of the invention includes first, second, and third containers each having a bottom wall and an annular wall transverse to the bottom wall and bounding an open side of the container opposite the bottom wall. The first container defines a cavity dimensioned to receive the second and third containers. The bottom walls of the first and second containers are imperforate, and the bottom wall of the third container is formed with perforations therethrough. Positioning elements can releasably position the second and third containers in the cavity of the first container in respective positions in which the bottom wall of the second and third containers are transversely offset from each other and from the bottom wall of the first container, and the second and third containers are open in the same direction as the first container.

Other features, additional objects and many of the attendant advantages of this invention will readily be appreciated as the same becomes better understood by reference to the following detailed description of preferred embodiments when considered in connection with the appended drawing in which.

Figure 1:
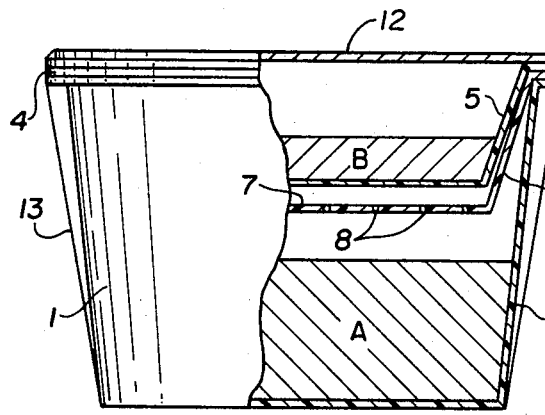
FIG. 1 shows a utensil according to the invention in side elevation and partly in elevational section.

Referring initially to FIG. 1, there is seen an outer, approximately cup-shaped container 1 of thermally insulating plastic. It has a flat bottom wall, and a frusto-conical, annular side wall flares transversely from the bottom wall toward the open top side of the container 1. An annular flange 2 projects radially outward from the side wall about the open top side.

Figure 3:
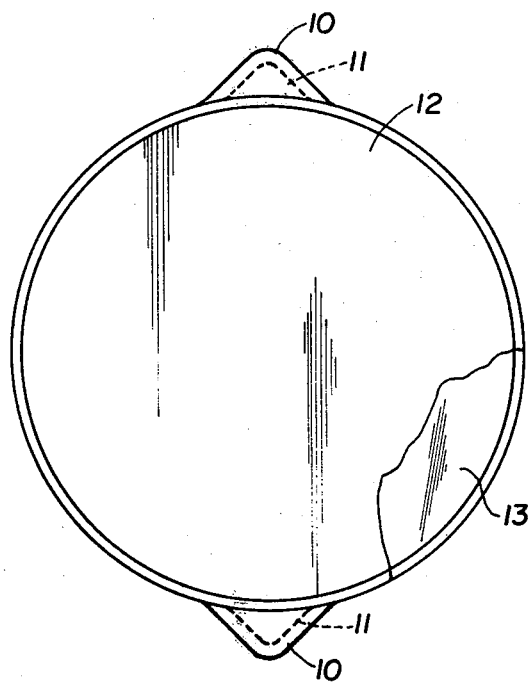
FIG. 3 is a top plan view of the device of FIG. 1.

The cavity of the container 1 is dimensioned almost completely to receive an intermediate container 3 and an inner container 5 nested in the container 3. The bottom walls of the containers 3, 5 are flat and circular, parallel to the bottom wall of the container 1 and of approximately equal diameter. The frusto-conical, annular side walls of the containers 3, 5 flare toward flanges 4, 6 sequentially superimposed on the flange 2. The bottom 7 of the intermediate container 3 has perforations 8 only partly shown in the drawing. Superimposed lugs 10, 11 project radially from the flanges 2, 4 as is shown in FIG. 3, but is not visible in FIG. 1. A flat, circular cover 12 of aluminum foil is held in position on the flange 6 by an envelope 13 of thermally shrunk plastic foil which also holds the three containers 1, 3, 5 in the position determined by the engaged flanges 2, 4, 6.

In that position, the perforated bottom wall 7 of the intermediate container 3 is interposed in spacedly parallel relationship between the bottom walls of the containers 1, 5 which respectively carry a main component A and a secondary component B of a two-component dish, such as pre-cooked rice and pieces of pre-cooked meat embedded in the fusible and/or soluble solid matter of a sauce. The device shown in FIG. 1 is capable of extended storage and may be transported without refrigeration.

When it is desired to eat the contents of the illustrated utensil, the foil envelope 13 is removed together with the cover 12, and at least the inner container 5 is taken out of the cavity of the outer container 1 to permit hot water to be poured over the rice A either directly or through the perforations 8 in the bottom wall 7. While the rice soaks in the hot water, hot water is poured into the inner container 5 to make the meat component B ready for eating, it being assumed that the latter component requires shorter soaking than the rice. With the intermediate container 3 held in position by the manually secured lugs 10, 11, the outer container 1 is inverted to drain the non-absorbed water from the rice through the perforations 8. The intermediate container 3 then is removed, and the prepared food may be eaten from the containers 1, 5 or from only one of the two containers into which the contents of the other container are dumped.

It is advantageous to make the outer container 1 of plastic which prevents premature cooling of the rice, and the containers 3, 5 may be made of the same material. Injection molded or vacuum molded containers 1, 3, 5 of thermoplastic synthetic resin composition are inexpensive enough to be disposable and are adequate since they are never exposed to the heat of a flame, the necessary hot water being prepared separately in a conventional manner, not shown.

Figure 2:
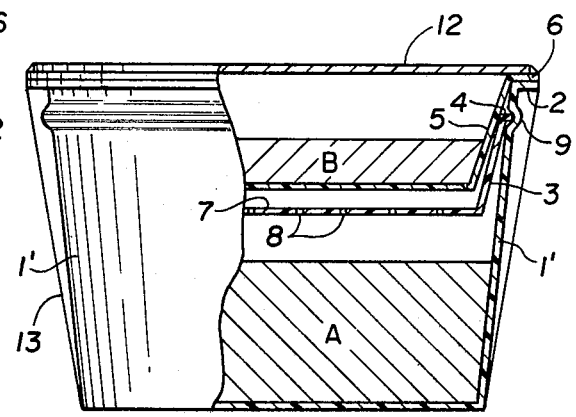
FIG. 2 illustrates a modification of the device of FIG. 1 in a corresponding view.

In the otherwise almost unchanged triple container of the invention shown in FIG. 2, the outer container 1' is formed with an annular outer rib 9 in its annular wall near the open end and a corresponding annular, internal groove in which the flange 4 of the intermediate container 3 is retained by a snap fit. The flange 6 of the inner container 5 rests directly on the flange 2 of the outer container 1'. The lugs 10, 11 are not needed in this arrangement.

Figure 4:
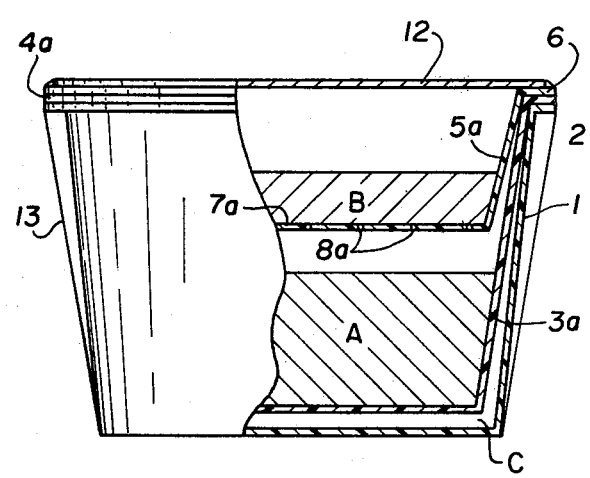
FIG. 4 is a view corresponding to FIG. 1 of another utensil of this invention.

Particularly for use outdoors at low temperature, the thermal insulation provided by the plastic outer containers 1, 1' may not be satisfactory, and the modified embodiment of the invention shown in FIG. 4 is preferred for such conditions.

The outer container 1 of the modified embodiment is substantially identical with the corresponding element shown in FIG. 1. The intermediate container 3a is only slightly smaller than the container 1 in whose cavity it is received except for the flange 4a which rests on the flange 2 of the outer container under the pressure of a plastic foil envelope 13 transmitted by a flat, circular cover 12. The dimensions of the intermediate container 3a are such as to define an insulating air space C between the imperforate bottom and side walls of the containers 1, 3a. The latter contains a body of precooked rice A.

The inner container 5a has a bottom wall 7a formed with perforations 8a, only partly illustrated, and its flange 6 is clamped between the cover 12 and the flange 4a by the foil envelope 13. Under the conditions for which the utensil of FIG. 4 is intended, the secondary component B is safely retained in the inner container 5a and does not liquefy and drip through the perforations 8a.

When the two-component dish A-B is to be prepared for eating, at least the solid cake of component B is removed from the opened triple container, and water is poured over the main component A in the intermediate container 3a as described with reference to FIG. 1. When the component A is ready to eat, the water is drained out through the perforations 8a of the container bottom wall 7a. The intermediate container 3a may then be removed from the outer container 1 for the brief period necessary for reconstituting the component B in the outer container 1 with additional hot water. The two components may then be combined in the container 3a and eaten from the intermediate container while protected against excessive heat loss by the air space C between the containers 1, 3a.

As not shown explicitly in FIG. 4, the inner and intermediate containers 5a, 3a are held engaged by lugs analogous to the lugs 10, 11 shown in FIG. 3 while excess water is drained from the rice A, and such lugs may be avoided if the inner container 5a is secured in the intermediate container 3a by its flange 6 being received in a groove of the intermediate container in a manner obvious from FIG. 2.

While the use of the containers of the invention has been described only with reference to a single, two-component dish, applications of the container for the preparation of other multicomponent dehydrated foods will readily suggest themselves.

It should be understood, therefore, that the foregoing disclosure relates only to preferred embodiments of the invention, and that it is intended to cover all changes and modifications of the examples of the invention chosen herein for the purpose of the disclosure which do not constitute departures from the spirit and scope of the invention set forth in the appended claims.

What is claimed is:

1. A method of packaging and preparing at least two dehydrated food products comprising the steps of providing a lower tray-like container member having an imperforate bottom wall and having a first surrounding wall of a first height and a first upper surrounding rim at the top of the first surrounding wall thereby forming an open end of the lower container member, providing an intermediate tray-like container member having a perforated bottom wall and a second surrounding wall of a second height which is less than said first height and a second upper surrounding rim at the top of the second surrounding wall, providing an upper tray-like container member having an imperforate bottom wall and having a third surrounding wall of a third height which is less than said second height and a third upper surrounding rim at the top of the third surrounding wall thereby forming an open end of said upper tray-like container member, said third upper surrounding rim being a projecting rim, containing a first dehydrated food product in the lower container member, separately containing a second dehydrated food product in the upper container member, positioning the second surrounding wall of the intermediate container member inside the lower container member by contacting the second upper surrounding rim against the lower container member in the region of its open end such that the perforated bottom wall of the intermediate container member is supported above the first dehydrated food product in the lower container member, positioning the third surrounding wall of the upper container member inside the intermediate container member by contacting the third upper surrounding rim against one of the first and the second upper surrounding rims such that said bottom wall of said upper container member is supported in position above the perforated bottom wall and the first dehydrated food product, and enclosing at least said open end of said upper tray-like container member from the atmosphere with enclosing means and, when ready for reconstituting, removing said enclosing means, removing the upper container member including the second dehydrated food product from the position above the first dehydrated food product, applying hot water to the first dehydrated food product in the lower container member thereby reconstituting the first dehydrated food product, draining excess hot water from the first food product through the perforations in the bottom wall of the intermediate member, and separately applying hot water to the second dehydrated food product thereby reconstituting the second dehydrated food product.

2. The method of claim 1, including applying hot water to the second dehydrated food product after removing the upper container member from the position over the first dehydrated food product in the lower container member.

3. The method of claim 1, including holding the intermediate container member in position relative to the lower container member after applying hot water to the first dehydrated food product in the lower container member, and inverting the lower container member thereby draining excess water from the first dehydrated food product through the perforations in the bottom wall of the intermediate container member.

* * * * *